H. P. ALLEN.
Cotton-Planter.
No 21,308.
Patented Aug. 31, 1858.
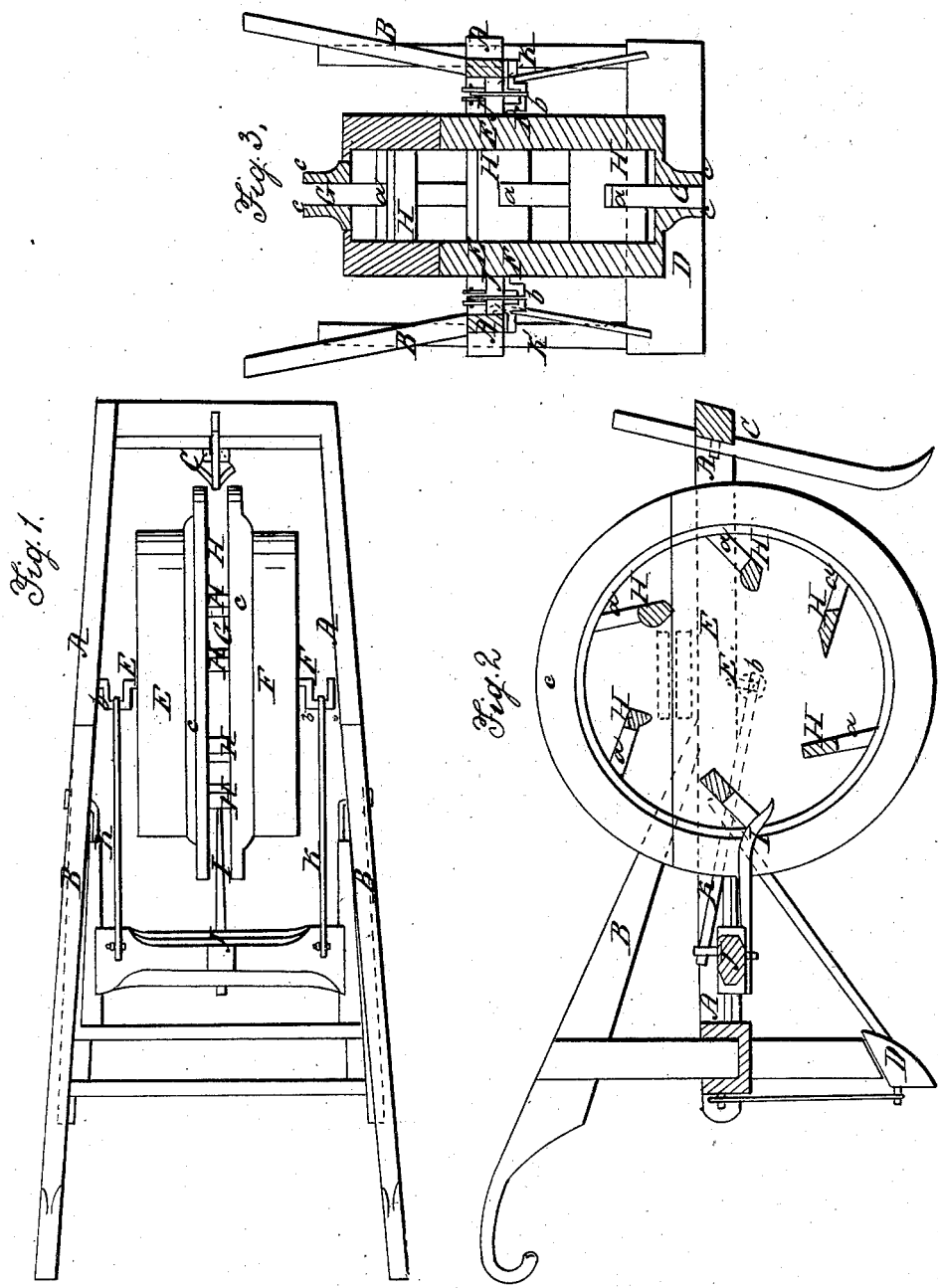

UNITED STATES PATENT OFFICE.

HORATIO P. ALLEN, OF BOWLING GREEN, KENTUCKY.

IMPROVEMENT IN COTTON-SEED PLANTERS.

Specification forming part of Letters Patent No. 21,308, dated August 31, 1858.

*To all whom it may concern:*

Be it known that I, HORATIO P. ALLEN, of Bowling Green, in the county of Warren and State of Kentucky, have invented a new and useful Improvement in Cotton-Seed Planters; and I do hereby declare that the following is a full, clear, and exact description of the same, reference being had to the accompanying drawings, forming a part of this specification, in which—

Figure 1 is a plan of a cotton-seed planter constructed with my improvements. Fig. 2 is a vertical longitudinal section of the same. Fig. 3 is a vertical transverse section of the same.

Similar letters of reference in each of the several figures indicate corresponding parts.

The nature of my invention consists in giving the hook which separates and insures the escape of the seed at the rear through the central space of the circular rotating hopper a reciprocating motion, said motion being accomplished by attaching the hook to a sliding transverse bar and having said bar connected to two wrists formed on the axle of the circular rotating hopper. By giving the hook a reciprocating motion, the seed are separated and pulled out through the discharge-space more perfectly, and the dirt which may have collected in the central discharge-space is knocked away with very little loss of power, as the hook, when drawn out, affords a longer leverage, and by its own motion and that of the hopper cuts or breaks up the dirt and cause it to fall out of the space.

My invention also consists in the tangentially-set lifting-shelves when slotted and used on the inner circumference of a rotating hopper which has a continuous discharge-passage, whereby the seed are lifted and held till they are brought to the front and rear parts of the hopper, and thus their discharge insured at these two points at the same time, the hook drawing one portion of the seed off of the left shelf and out at the rear of the hopper, while another portion is escaping at the front by their own gravity, owing to the shelves, when at the front of the rotating hopper, becoming inverted and compelling the seed to fall down and discharge through the central space of the hopper.

To enable others skilled in the art to make and use my invention, I will proceed to describe its construction and operation.

A represents the frame of the cotton-planter; B B, the handles; C, the furrow-opener, and D the hinged suspended semicircular concave coverer.

E is the seed-hopper. It is arranged on an axle, F, which has a rotary motion. This hopper has a central discharge-space, G, all round it, and on each side of said space a narrow furrow-conforming flange, *c c*, is provided, as usual.

H H are the lifting-shelves. They are slotted at *a*, and are set tangentially round the inner circumference of the hopper, the slots in them coming opposite and corresponding with the discharge-space G of the hopper. By setting the shelves as shown, those which arrive at the back of the hopper partially hold the seed until they are drawn out, while those which arrive at the front necessarily drop the seed and allow them to discharge, they having in their revolution picked up seed and carried them round to the front point of discharge, and soon after the discharge at the front was accomplished commenced again to pick up seed and carry them round to the back point of discharge.

I is the curved hook for separating and drawing the seed from the back part of the hopper, also for removing dirt from the discharge-space, and thus preventing clogging of the machine.

J is the reciprocating cross-bar to which the hook I is attached; K K, rods which connect the sliding cross-bars to crank-wrists *b b* of the axle F, as shown. The wrists *b b* give the cross-bar and the hook a reciprocating motion as the axle revolves, and thus the separation and withdrawal of the seed from the hopper through the space G is accomplished very effectually.

What I claim as my invention, and desire to secure by Letters Patent, is—

1. The combination of the hook when arranged to reciprocate, with rotating hoppers, substantially as and for the purposes set forth.

2. The tangentially-set shelves when slotted and used on the inner circumference of a rotating hopper which has a continuous discharge-passage, G, as specified, and for the purpose set forth.

The above specification of my improvement in cotton-seed planters signed by me this 21st day of July, 1858.

HORATIO P. ALLEN.

Witnesses:
G. YORKE ATLEE,
EDM. F. BROWN.